June 2, 1959     A. BRUEDER     2,888,912
FUEL-INJECTION SYSTEM FOR SPARK-IGNITION ENGINE
Filed Dec. 7, 1955
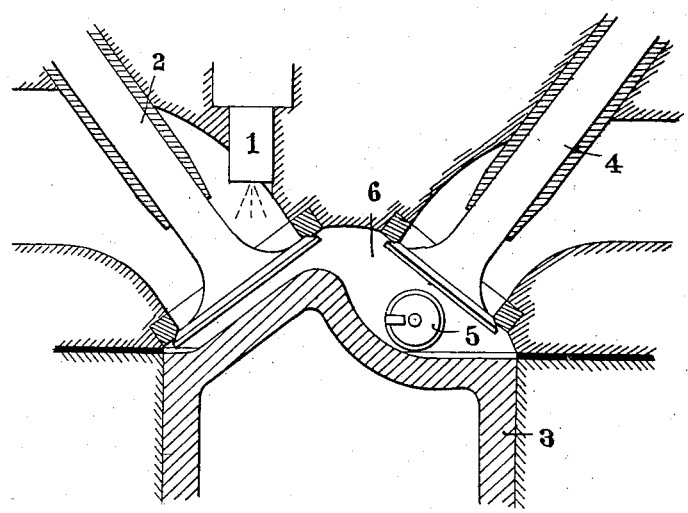

United States Patent Office 2,888,912
Patented June 2, 1959

2,888,912
FUEL-INJECTION SYSTEM FOR SPARK-IGNITION ENGINE

Antoine Brueder, Paris, France, assignor to Société Anonyme Andre Citroen, Paris, France Application December 7, 1955, Serial No. 551,693

Claims priority, application France May 13, 1955

1 Claim. (Cl. 123—28)

This invention relates in general to internal-combustion engines and has particular reference to fuel-injection spark-ignition engines.

There are two methods of feeding fuel to internal-combustion engines, i.e. by carburetion and by fuel injection.

It is widely known that the fuel-injection system consists broadly in injecting fuel directly into the combustion chamber or cylinder and that it provides a non-homogeneous or stratified air-fuel mixture, and that by properly combining the stratification with the turbulence or air-swirl effect, it is possible to burn either rich mixtures giving a high power rating or mixtures leaner than those obtained with ordinary carburetion for higher efficiency.

However, injection systems have proved costly and complicated to manufacture up to now.

With this invention it is possible to combine the advantages of direct injection (i.e. into the cylinder or combustion chamber) with a design much more simple than hitherto known propositions. The system forming the subject-matter of this invention consists in locating the fuel injector orifice as close as possible to, and upstream of, the inlet port of the cylinder, this fuel injection taking place just before the induction stroke, it being possible to cause both events (injection and induction) to overlap each other. With this procedure a complete atomizing of the fuel charge is not necessary because this fuel charge will be carried along by the combustion air at the beginning of the induction stroke so as to be atomized and partially vaporized when flowing through the inlet port, the relatively narrow opening of this port producing a substantial throttling or stratifying effect. On the other hand, as the complete fuel charge penetrates into the cylinder at the beginning of the induction stroke, only pure air is admitted at the end of the induction stroke, so that a heterogeneous mixture is obtained. Experience teaches that this result is not obtained if the fuel is delivered continuously in the vicinity of the inlet port or if the injection is effected during the induction stroke, unless the injection is carried out in the form of jets passing directly from the injection nozzle into the cylinder or combustion chamber, but in this case a direct injection system would be obtained.

In order to afford a clearer understanding of the present invention and of the manner in which the same may be carried out in the practice, a preferred form of embodiment thereof will be described hereafter by way of example with reference to the single figure of the attached drawing forming part of this specification.

In this figure a fuel injector 1 is located in the intake duct very close to the inlet valve 2. The piston 3 is so shaped as to form with the inner wall of the cylinder-head, in the region of the exhaust valve 4, a turbulence chamber 6 in which the spark plug 5 is located.

This arrangement operates as follows:

Fuel is injected through the injector 1 at the end of the exhaust stroke. The inlet valve 2 opens and causes the fuel to be forced into the cylinder by the combustion air, the second phase of the induction stroke consisting in introducing only pure air into the cylinder. Just before the end of the compression stroke the greater part of the heterogeneous mixture flows into the turbulence chamber 6 in which the ignition is produced by means of the spark plug 5. As is in the case of direct-injection systems it is also possible to associate the stratifying or throttling effect with the turbulence, the latter being properly effected in relation to the spark plug position, and to burn rich mixtures giving maximum power or lean mixtures which permit maximum economy and maximum thermal efficiency.

Of course, the form of embodiment of the invention which is described hereinabove and shown in the attached drawing is given by way of example only and should not be construed as limiting the present invention, as many modifications may be brought thereto without departing from the spirit and scope of the invention, as set forth in the appended claim.

What I claim is:

An internal combustion engine comprising at least one cylinder having an inlet port and an exhaust port, an inlet valve for opening and closing said inlet port, an exhaust valve for opening and closing said exhaust port, a piston reciprocated in said cylinder and formed with a head shaped to close nearly completely said inlet port and provide in front of said exhaust port a turbulence chamber of reduced volume when said piston is in its top dead center, an ignition spark plug in said turbulence chamber and a fuel injection device disposed before and in the vicinity of said inlet port and adapted to begin the fuel injection just before the opening of said inlet valve.

References Cited in the file of this patent
UNITED STATES PATENTS

| | | |
|---|---|---|
| 1,662,040 | Lee | Mar. 6, 1928 |
| 2,306,733 | Joslyn | Dec. 29, 1942 |
| 2,511,213 | Leslie | June 13, 1950 |
| 2,580,951 | Pescara | Jan. 1, 1952 |

FOREIGN PATENTS

| | | |
|---|---|---|
| 708,807 | Great Britain | May 12, 1954 |